United States Patent [19]

Walters et al.

[11] Patent Number: 5,434,475

[45] Date of Patent: Jul. 18, 1995

[54] LIGHT RELAY WITH ADJUSTABLE CORE AND CONTACT GAP

[75] Inventors: Jeff D. Walters, Marshfield; Paul M. Buonpane, Mansfield, both of Mass.

[73] Assignee: Pacific Scientific Company, Weymouth, Mass.

[21] Appl. No.: 816,551

[22] Filed: Jan. 2, 1992

Related U.S. Application Data

[63] Continuation-in-part of Ser. No. 816,493, Dec. 31, 1991, abandoned, which is a continuation-in-part of Ser. No. 584,087, Sep. 18, 1991, Pat. No. 5,132,596.

[51] Int. Cl.$^6$ ............................................. H05B 37/02
[52] U.S. Cl. ..................................... 315/159; 335/67; 335/105; 315/149; 250/206
[58] Field of Search ................. 315/159, 149; 250/206, 250/214 AL, 173; 335/64, 67, 96, 104, 99, 105, 2, 258, 200, 86, 229, 148, 81, 98, 80, 203, 197, 298, 251

[56] References Cited

U.S. PATENT DOCUMENTS 1,726,164 8/1929 Queeney ........................... 335/67
2,839,631 6/1958 Rice ................................. 335/105
2,967,981 1/1961 Wise ................................ 315/159

Primary Examiner—Robert J. Pascal
Assistant Examiner—Michael B. Shingleton
Attorney, Agent, or Firm—Lahive & Cockfield

[57] ABSTRACT

An outdoor lighting control includes a photosensor responsive to ambient outdoor light and an alternating current relay with a pair of contacts movable between make and break positions. The relay includes a contact actuating arrangement that responds to the photosensor and alternating current bias the contacts into a make position and move the contacts electromagnetically into a break position. The contact actuating arrangement includes a coiled extension spring for moving the contacts into the make position and a resilient armature which biases the armature toward the break position. The spring and armature have respective resiliences sufficiently stiff and responsive to the alternating current to limit chatter in the contacts during passage from the make position to the break position to 15 milliseconds when the photosensitive means senses a transition between dark and daylight.

9 Claims, 2 Drawing Sheets

LIGHT RELAY WITH ADJUSTABLE CORE AND CONTACT GAP

RELATED APPLICATIONS

This application is a continuation-in-part of the and commonly assigned application Ser. No. 816,493, filed Dec. 31, 1991, now abandoned; which is a continuation-in-part of application Ser. No. 584,087, filed Sep. 18, 1991, now U.S. Pat. No. 5,132,596.

BACKGROUND OF THE INVENTION

This invention relates to outdoor lighting controls (OLCs) and particularly to improvements for extending the life span and manufacturing ease of outdoor lighting controls.

In one type of outdoor lighting control, a normally closed alternating current (AC) relay responds to a photosensitive element which acts to open and close current in the relay's contacts on the basis of ambient light conditions and thereby turn on a lamp during the night and turn it off during daylight. At night the photosensitive element limits the current to the relay which closes the relay contacts. This connects the lamp to its power source and turns the light on. During daylight, the photosensitive element permits higher alternating current to open the contacts. This opens the circuit from the alternating current lines to the lamp and turns the light off in daylight.

OLCs must operate reliably for long periods such as ten years. However, their life span has often been much shorter and their operation unreliable because the AC relay contacts often exhibit chatter, i.e. rapid opening and closing, as the OLC operation shifts from one condition to another during the change from daylight to night at dusk, and from night to day at dawn. The very slow change in light intensity exacerbates this effect. The repeated opening and closing of the contacts causes them to wear out and the lighting control to operate unreliably. Eventually this reduces the life span of the OLC.

OBJECTS AND SUMMARY OF THE INVENTION

An object of the invention is to improve outdoor lighting controls.

Another object of the invention is to avoid these difficulties.

Still another object is to simplify the manufacture of outdoor lighting controls.

According to a feature of this invention, these objects are attained in whole or in part by making the contact actuating portion of the relay sufficiently stiff and responsive to alternating current to limit the chatter to less than 15 milliseconds.

Another feature of the invention involves biasing the armature to its normal, closed, non-actuated condition with a spring that flexes the armature in a direction that opposes the tension of the spring in its non-actuated condition. This serves to make the force opposing the magnetic attraction on the armature of the OLC's relay, more constant, and preferably substantially constant, over the travel of the armature.

Another feature of the invention involves making the force of the magnetic attraction on the armature more nearly constant, and preferably constant as a function of time by a balance of forces.

According to another feature of the invention, the spring is a tensioned coil spring, preferably exerting its force on the side of a fulcrum opposite the contact of the armature.

Another feature of the invention involves including in the contact actuating portion a winding with an axial ring and a shading core and placing the shading ring on the axial core of the relay's winding inside the longitudinal bounds of the winding.

Another feature of the invention involves stiffening the contact carrier of the relay's armature to limit chatter to less than 15 milliseconds.

These and other features of the invention are pointed out in the claims, Other objects and advantages of the invention will become evident from the following detailed description when read in light of the accompanying drawings.

BRIEF DESCRIPTION OF THE DRAWINGS

FIG. 1A is a bottom view of an outdoor lighting control according to FIG. 1.

DETAILED DESCRIPTION OF PREFERRED EMBODIMENTS

Figure 1:
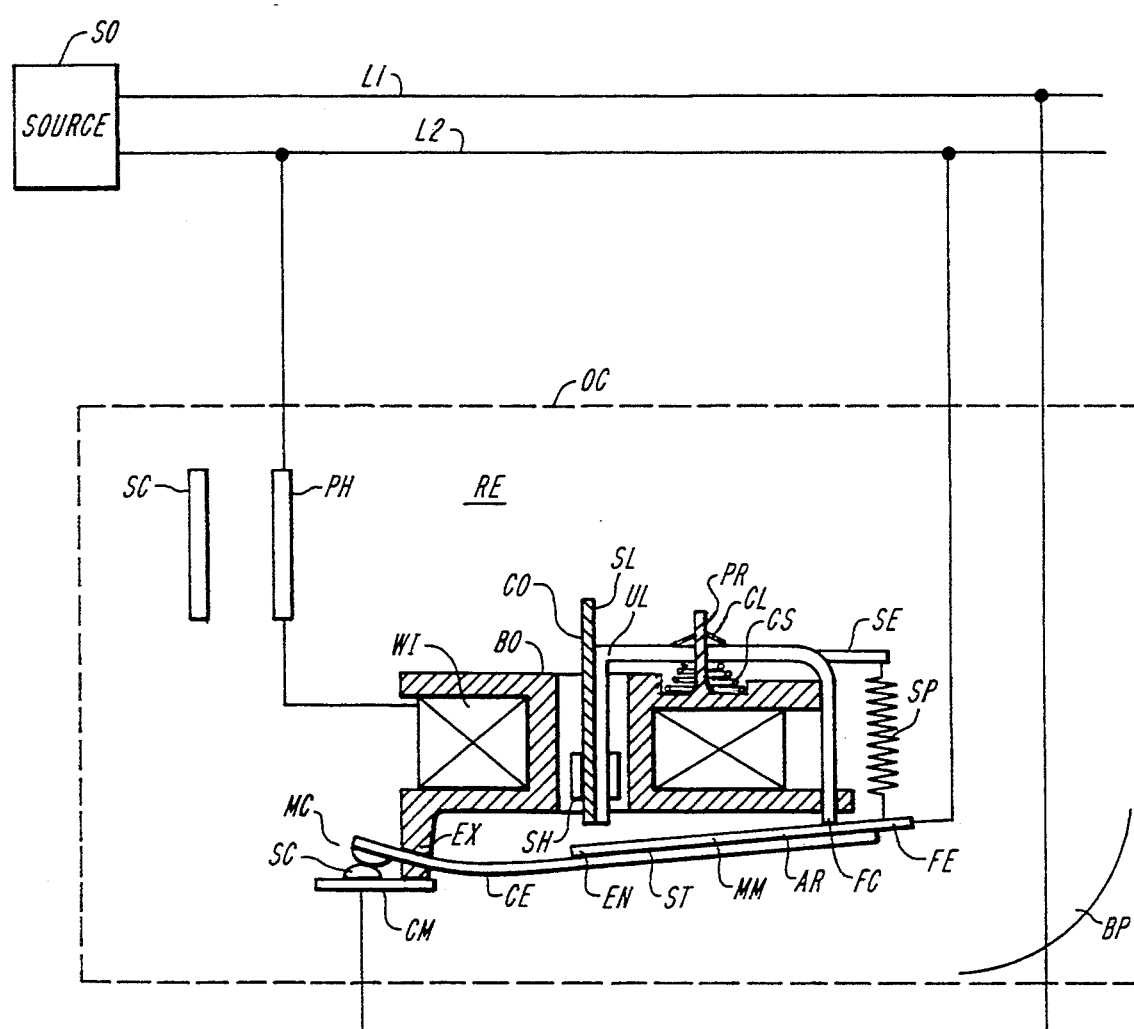
FIG. 1 is a partially cross-sectional plan view and partially schematic illustration of an outdoor lighting control connected in a network and embodying features of the invention.

In FIG. 1, a utility power source SO or transformer energizes power lines L1 and L2, and an outdoor lighting control (OLC) OC embodying features of the invention controls the current from the lines L1 and L2 to a lamp LP which may for example be mounted on a utility pole (not shown). The control OC responds to ambient light by interrupting current flow to the lamp LP during the day and closing its contacts to pass current to the fixture at night, to make the lamp illuminate the surrounding area. Suitable shielding (not shown) prevents the control OC from responding to the light of the lamp LP. At the same time, the control OC is adjusted to interrupt the current in response to light intensities greater than the intensities normally available at night from surrounding lamps.

In the control OC, a photoresistor PH responds to passage of ambient light through an adjustable light screen SC and varies the resistance between the line L2 and a winding WI of a normally closed relay RE. The opposite end of the winding WI connects the relay to the line L2. Thus the photoresistor PH determines the current passing through the winding WI.

A bobbin BO supports the winding WI and a magnetic axial core CO composed of a straight lamination SL and a U-shaped lamination UL projects through the center of the bobbin. A shading ring SH surrounds the core CO within the axial extent of the bobbin BO and preferably the winding WI.

A projection PR extending integrally from the bobbin BO and a clamp composed of a so called Tinnermann clip CL and a coiled spring CS mount the core CO and bobbin BO relative to each other. Straight lamination SL and the U lamination UL are welded or otherwise secured to each other.

A spring extension SE cantilevered integrally and outwardly from the U-shaped lamination UL supports one end of a coiled tension spring SP whose other ends pulls upwardly on one fulcrum end FE of an armature AR. The outer end of the U lamination UL forms a fulcrum FC for the armature AR. Suitable extensions (not shown) from the bobbin BO engage the armature AR to prevent lateral or longitudinal movement of the armature. According to an embodiment of the invention, the extensions for preventing lateral or longitudinal movement of the armature AR also protrude, or extend instead, from the U lamination UL at the fulcrum FE. The extension at the fulcrum forms a hinge about which the armature AR swings.

FIG. 1A, which is a plan view of the relay RE from the bottom of FIG. 1, shows a pair of the bobbin extensions BX1 and BX2 engaged in notches on each lateral side of the armature AR. The armature tabs AT that :form the notches illustrate the noted extension of the armature.

Forming the armature AR is a magnetic member MM which terminates at an end EN beyond the core CO and an electrically conductive strip ST, illustratively of beryllium-copper, which terminates in a movable conductive contact MC. In the normal or rest position of the relay RE, the spring SP draws the fulcrum FE of the armature AR upwardly as shown in the drawing about the fulcrum FC and forces the movable contact MC against a stationary contact SC mounted on a conductive member CM secured to an extension EX of the bobbin BO. In this position, the force of the spring SP flexes the cantilevered end CE of the strip ST holding the movable contact MC as the latter engages the stationary contact SC. The cantilevered end CE bends upwardly.

FIG. 1A also illustrates the mounting of the conductive member CM to the bobbin extension EX, namely with rivet-like posts on the extension and that seat in holes through the conductive member.

The flexure of the end CE causes a wiping action between the contacts MC and SC when the contacts first engage each other in response to the spring SP drawing the end FE upwardly toward the rest position of the armature. The release of the flexure in the end CE invokes a dewiping action when the contacts SC and MC disengage in reaction to energization of the winding WI.

When the alternating current through the winding WI exceeds a threshold the current induces a magnetic field sufficient to cause the magnetic core CO to attract the magnetic member MM of the armature AR against the force of the spring SP. The current through the winding WI induces a magnetic field in the core CO, and the latter imposes an attractive force upon the end EN of the magnetic member MM of the armature AR. This occurs regardless of the direction of the current.

It is believed that in effect, the alternating current theoretically attempts to produce a force having an amplitude corresponding to a full-wave rectified sine wave. The shading coil SH, of a single heavy copper turn conducts a current induced by the magnetic field which the winding WI initially induces in the core CO. The shading ring SH thus constitutes the secondary of the transformer in which the winding WI is the primary. The current in the secondary is 90 degrees out of phase with the current in the primary. The result is that the core CO applies a force with two components, namely a rectified-sine component and a second rectified sine component shifted 90 degrees. The result of the components constitutes a unidirectional force having a ripple. It is believed that the position of the shading ring SH inside the winding WI causes efficient generation of a flux component with an amplitude nearly as large as the flux from winding WI and nearly a 90 degree phase shift. This is useful in reducing chatter.

When the photoresistor PH exhibits a resistance below a threshold, i.e. enough to allow a threshold current through the winding WI, the unidirectional force upon the armature AR is sufficiently great to attract the armature end EN toward the core CO against the force of the spring SP, and the conductive end EN draws the movable contact MC away from the stationary contact SC. However, during the initial movement of the armature AR, the movable contact does not break with the contact SC but rather the flexed conductive end CE begins to unflex. Over this time period, the movable contact MC dewipes against the stationary contact SC in a substantially lateral direction along the long dimension of the armature AR before breaking contact. This dewiping action tends to smooth out any pits caused by sparking of the contacts MC and SC when they make contacts (make operation) and break contact (break operation).

The spring SP drawing up the end FE creates a downward force on the end CE of the armature AR through the fulcrum FC. Hence when a current through the winding WI energizes the winding and magnetically induces the core CO to exert a force on the armature AR, the force must reach a threshold value sufficient to overcome the action of the spring SP. The flexure of the end CE of the armature AR aids the magnetically induced force of the core CO in surmounting the action of the spring SP and in disengaging the contacts MC and SC.

The tensioned coil spring SP assumes an extended condition both when the armature AR is up and when it is down. In one embodiment of the invention, the spring SP, when it stretches from the unactuated closed state of the relay RE to the actuated state, expands only over a minor proportion of its possible range of resilience. In one embodiment the proportion is less than 5 percent. In another, it is less than 1 percent. Therefore, the force of the spring SP increases only slightly as it stretches from the normally closed position of the relay to the relay's open position.

In these embodiments the combined action of the spring SP and the flexure of the conductive end CE of the armature AR aid in producing the disengagement and reducing chatter.

Figure 3:
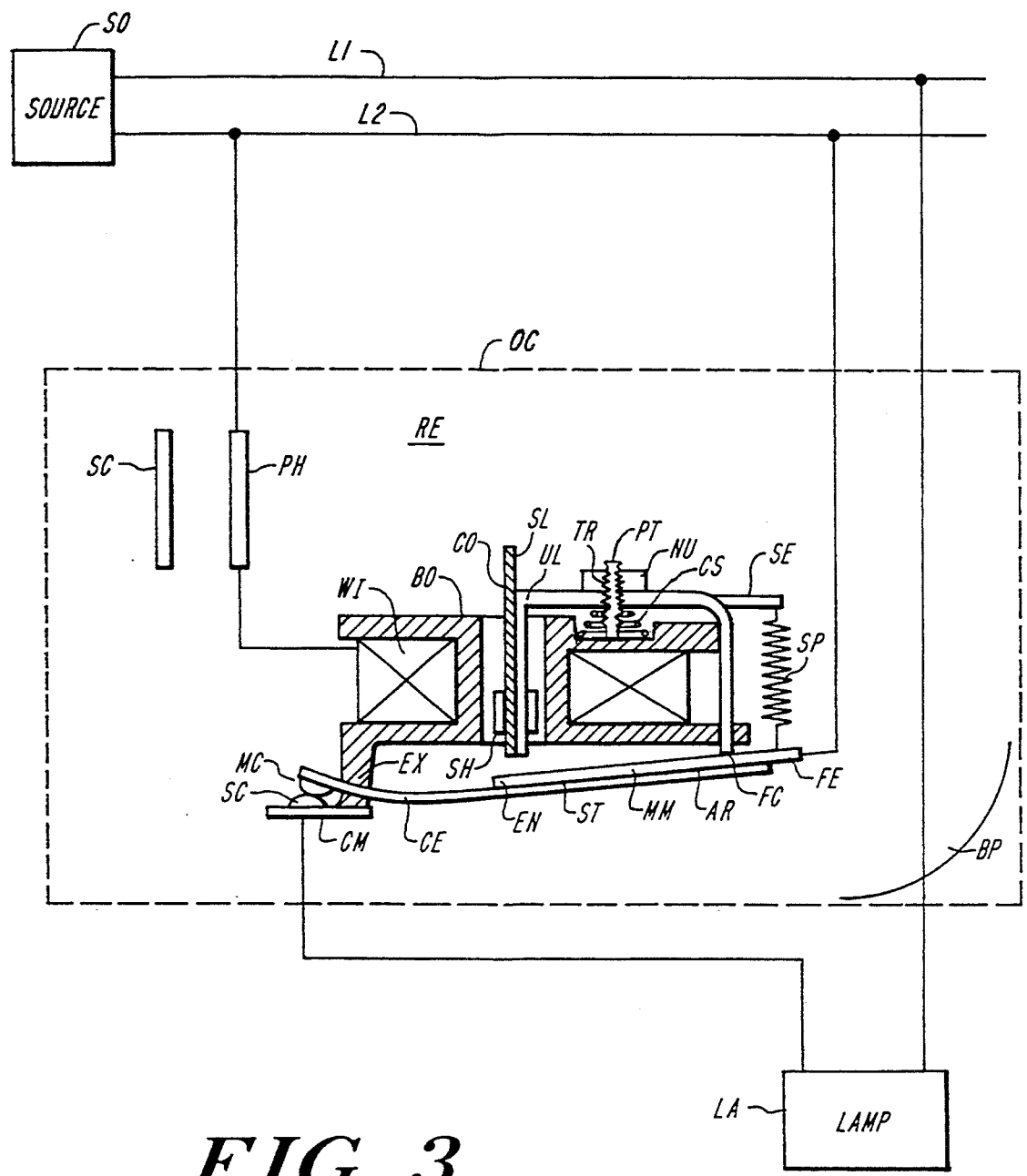
FIG. 3 illustrates still another embodiment of the invention.

To further reduce chattering and simplify manufacturing, the Tinnerman clip CL and the threaded nut NU, FIG. 3, on the threaded projection PR allow upward and downward shifting of the U-shaped lamination UL relative to the extension EX on the bobbin BO, and hence of the contact SC relative to the moving contact MC. This permits adjustment of the gap between contact MC and SC as well as modification of the flexure of the end CE. Additionally, the clip CL and nut NU allow further control of chattering, pitting, and aging of the contacts.

The spring CS and Tinnermann clip oppose each other. The U lamination UL, straight lamination SL, shading ring SH, armature AR, spring SP, strip ST, and contact MC move as a single unit to adjust the contact gap. Hence the relay spring force remains substantially a constant during adjustment of the contact gap. The bobbin BO is stationary.

In a normal position of the relay RE, when the contacts MC and SC are in the make position, current flows from the line L2 through the contacts MC and SC to the lamp LP and back to the line L1. In the break position, the contacts MC and SC do not conduct across the gap between them and thereby interrupt current flow through the lamp LP.

The strip ST is sufficiently stiff in view of the chatter, and in view of the remaining stiffness of the members supporting the contacts MC and SC, to lower its flexing and wiping of the contacts MC and SC to the point that any chatter upon making or breaking contact is less than 15 milliseconds and preferably between 1 and 10 milliseconds.

In operation, the photosensor PH senses ambient light through or over the screen SC, which is movable into and out of the paper as shown in FIG. 1 to permit calibration of the OLC. During the night, the low ambient light level raises the resistance of the photoresistor PH and limits the current flow to the winding W1 to a value insufficient for the magnetic flux in the core CO to overcome the force of the spring SP. The relay RE then remains in its normal or rest position. That is, the contacts MC and SC engage each other. This allows current flow from the line L2 through the contacts MC and SC to the lamp LP and back to the line L1.

At dawn, the resistance of the photoresistor PH decreases. At a threshold determined by the characteristics of the relay and the position of the screen SC, the core CO draws the armature AR toward the core CO and causes the contacts MC and SC to disengage and break. Current then ceases to flow to the lamp LP until the evening when darkness again raises the resistance of the photoresistor PH until insufficient current flows in the winding WI to attract the armature AR. The spring SP causes the armature AR to return to its normal position in which the contacts MC and SC engage each other.

The core CO attracts the armature AR against the force of the spring SP, but with the aid of the flexure in the end CE, to break the engagement between the contacts MC and SC when the current through the winding W1 and the resulting magnetic field reach a threshold value. This threshold value depends in part on the force of the spring SP and the flexure of end CE. The spring SP, together with the flexure of end CE, aid in countering the effect of alternating ripple which tends to make the disengagement point somewhat indefinite and encourages chatter, i.e. repeated opening and closing of the contacts MC and SC.

In one embodiment the invention avoids the consequence of chatter which, according to one theory, evolves because the threshold value would first arrive when a ripple reaches its peak. This causes the end CE of the strip ST to unflex and the contacts MC and SC to dewipe and disengage in response to the magnetic force of the core CO. However, as the ripple passes its peak, instantaneous force may actually drop even though the average force continues to go up in response to increasing ambient light. Accordingly, the contact MC tends to move more slowly or perhaps even drop back toward the contact SC and re-engage the contact SC. This may happen several times over several ripples and continue for as much as fifty milliseconds. This effect is exacerbated by the slowness with which the ambient light brightens at dawn or darkens in the evening. Under these circumstances, although the average force is slowly increasing, the moving contact MC is repeatedly being moved back and forth and chattering against the contact SC. This hastens the destruction of the contacts MC and SC.

According to various embodiments of the invention, the strip ST is sufficiently stiff to limit the flexure of the end CE in the wiping action of the contacts MC and SC in proportion to the ripple so as to limit the chatter to less than fifteen milliseconds. At the same time, it is believed that placing the shading ring SH within the axial bounds of the bobbin BO within the winding W1 causes a closer linking of the winding WI with the shading ring SH beyond that produced by the core CO so as to further smooth the ripple. A third effect may arise from the stiffening effect of the stationary and movable contacts SC and MC both being mounted or unitized on the bobbin BO. Another influence is the action of the spring SP and its coaction with the armature AR. Yet another is the result of the shading ring SH within the bobbin BO. In one embodiment, the combined effects are believed to help limit the chatter time.

Further adding to limit the chatter time are the threaded nut NU, FIG. 3, and the threaded projection PR which permit control of the gap at the contacts MC and SC. Also helping are the U-shaped lamination UL, straight lamination SL, shading ring SH, armature AR, spring SP, strip ST, and contact MC which move as a single unit to adjust the contact gap. Hence the relay spring force remains substantially constant because of unintended variation in the contact gap. The bobbin BO is always stationary.

The strip ST is made of a springy, stiff, resilient material.

The stiff strip ST substantially increases the speed of breaking contact between the contacts SC and MC. Furthermore, the stiff strip ST permits a short travel distance for the member MM on the armature AR. According to another embodiment of the invention, relationships of the ripple and the stiffness of the strip ST and other parts are such as to limit the chatter time to between one millisecond and ten milliseconds. According to another embodiment, the spring SP adds to the limiting effect.

The entire OLC structure is mounted on a base plate BP shown only as a curved line in FIG. 1.

Figure 2:
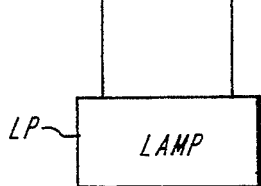
FIG. 2 is an elevation view of the outdoor lighting control shown in FIG. 1 and embodying features of the invention.
Figure 2:
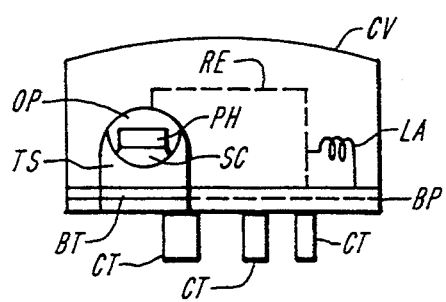

As shown in FIG. 2, the base plate BP with the relay RE, photosensor PH and screen SC is covered with a plastic cover CV having a light opening OP that reveals the photosensor PH and the screen SC mounted within a track support TS. Connectors CT project from the base plate. A coiled lightning arrestor LA connects the relay, and preferably the armature AR, to ground.

The invention is based upon the recognition that the wiping and dewiping effects are less than usual but that over a 10 year life span the OLC contacts will make and break less than five thousand times and that each time the make and especially the break will be comparatively slow. The invention reduces the chatter.

The straight lamination SL projects upwardly, beyond the U-shaped lamination UL as appears in FIG. 1, to concentrate the flux which would normally leak from the core. The invention uses only two laminations rather than three or more to assure as flat a poleface as possible on the core CO, and therefore the most intimate possible contact with the member MM. It also fixes the thickness of the core more closely than otherwise. This aids in the chatter limitation.

The small range of travel of the member MM allows reliability and comparative constancy in spring tension of the spring SP. The position of the spring SP at the end FE of the armature AR relative to the fulcrum FC and the much longer length of the armature from fulcrum to the contact MC further aid the chatter limiting effect.

Another embodiment of the invention appears in FIG. 3. This embodiment is, with certain exceptions, identical with the embodiment of FIG. 1. In FIG. 3 a protrusion PR, illustratively with threads TR, extends integrally from the bobbin BO. A threaded nut NU screwed onto the protrusion PR and a coiled spring CS, between the lamination UL and the bobbin BO, mount the core CO and the bobbin BO relative to each other. Straight lamination SL and the U-shaped lamination UL are welded or otherwise secured to each other. Rotation of the threaded nut NU on the threaded protrusion PT moves the bobbin BO axially relative to the core CO and establishes the axial position of the bobbin BO relative to the core.

The threaded nut NU on the threaded protrusion PT and the spring CS serve further to reduce chattering, chatter time, and simplify manufacturing. The nut NU and the protrusion PR allow upward and downward shifting of the lamination UL relative to the extension EX on the bobbin BO, and hence of the force of the contact SC relative to the moving contact MC. This permits adjustment of the gap that occurs between contact MC and SC upon actuation of the relay. It permits simple modification of the flexure of the end CE. It engenders further control of chattering, pitting, and aging of the contacts. The adjustment permitted by the threaded nut NU and the threaded protrusion PR to permit control of the gap at the contacts MC and SC both during manufacturing and thereafter.

Cooperating with the nut NU, the protrusion PR, and the spring CS in FIG. 3, and with the Tinnermann clip CL and projection PR in FIG. 1, are the U-shaped lamination UL, straight lamination SL, shading ring SH, armature AR, spring SP, strip ST, and contact MC. These move as a single unit to adjust the contact gap. Hence the relay spring force remains substantially constant when the contact gap is adjusted within a range of values unintended variation in the contact gap. The bobbin BO is stationary, being mounted on the base plate BP, FIG. 2.

While embodiments of the invention have been described in detail it will be evident to those skilled in the art that the invention may be embodied otherwise without departing from its spirit and scope.

What is claimed is:

1. Lighting control apparatus having a photosensitive element in circuit with the coil of a relay for controlling, with the relay contacts, the application of electrical power to an electrical lamp in response to the level of light incident on the photosensitive element, said apparatus having the improvement comprising
   A. support means mounting the relay coil and mounting a stationary relay contact,
   B. armature means carrying a movable relay contact and arranged to move relative to the support means between an open position, where the movable contact is spaced by a gap from the fixed contact, and a closed position where the movable contact is engaged with the fixed contact,
   C. magnetic core means associated with said armature means for moving said armature means between said open and closed positions, and
   D. mounting means mounting said magnetic core means with said support means, said mounting means being adjustable for adjustably positioning said core means relative to said support means, for thereby selectively adjusting the width of said gap between said fixed and stationary contacts of said relay when in said open position.

2. Lighting control apparatus according to claim 1 in which said mounting means includes post means on said support means for mounting said magnetic core means.

3. Lighting control apparatus according to claim 1 in which said mounting means includes
   A. post means projecting from said support means, and
   B. clamp means adjustably positioned along said post means for adjustably mounting said magnetic core means on said post means.

4. Lighting control apparatus according to claim 3 in which said clamp means includes spring means resiliently engaged between said support means and said magnetic core means, and includes fastener means engaged with said magnetic core means and seated on said post means.

5. Lighting control apparatus according to claim 1 having the further improvement comprising
   spring means engaged between said magnetic core means and said armature means for resiliently maintaining said armature means in one of said positions,
   said spring means and said armature means moving together with said magnetic core means, relative to said support means and said stationary relay contact, upon adjustment of said mounting means.

6. Lighting control apparatus according to claim 1 having the further improvement comprising
   extension means on said support means and engaged with the armature means for preventing lateral or longitudinal movement of the armature relative to said support means.

7. Lighting control apparatus according to claim 1 having the further improvement
   A. in which said magnetic core means has a fulcrum engaged with said armature means and said movement of said armature means between said open and closed positions is movement about said fulcrum,
   B. further comprising a pair of spaced-apart spring supports respectively on said core means and on said armature means, and
   C. spring means engaged between said spring support means for resiliently biasing said armature means into one of said positions.

8. Lighting control apparatus according to claim 1 having the further improvement
   A. in which said core means has a fulcrum engaged with said armature means, and in which said movement of said armature means between said positions is movement about said fulcrum, and
   B. comprising extension means on said support means and engaged with the armature means for preventing lateral and longitudinal movement of the armature relative to said support means.

9. Lighting control means according to claim 1 having the further improvement wherein said support means forms a bobbin for the relay coil, and wherein said adjustable movement of said magnetic core means is relative to said fixed contact and to said bobbin and to said relay coil.

* * * * *